(12) United States Patent
Henderson

(10) Patent No.: US 7,703,418 B2
(45) Date of Patent: Apr. 27, 2010

(54) ANIMAL TRAINING DEVICE

(76) Inventor: Steven Henderson, 6080 Pineglade Crescent, Ottawa, Ontario (CA) K1W 1H1

( * ) Notice: Subject to any disclaimer, the term of this patent is extended or adjusted under 35 U.S.C. 154(b) by 217 days.

(21) Appl. No.: 11/530,275

(22) Filed: Sep. 8, 2006

(65) Prior Publication Data

US 2008/0072849 A1    Mar. 27, 2008

(51) Int. Cl.
*A01K 27/00*    (2006.01)
(52) U.S. Cl. .................. 119/792; 119/794; 119/821; 119/823; 119/831
(58) Field of Classification Search ................ 119/792, 119/794, 821, 823, 831
See application file for complete search history.

(56) References Cited

U.S. PATENT DOCUMENTS

| 4,566,255 | A | 1/1986 | DeGroot |
| 5,732,660 | A | 3/1998 | David et al. |
| 6,053,128 | A | 4/2000 | McCulloch |
| 6,460,488 | B1 | 10/2002 | Manzella |
| 6,467,437 | B2 * | 10/2002 | Donovan et al. ............ 119/798 |
| 6,564,754 | B1 | 5/2003 | Cohen |
| 6,595,156 | B1 * | 7/2003 | Curran ...................... 119/792 |
| 6,796,274 | B1 | 9/2004 | Moynihan, III |
| 6,971,334 | B1 | 12/2005 | Livesay et al. |

* cited by examiner

*Primary Examiner*—Timothy D Collins
*Assistant Examiner*—Valentina Xavier

(57) ABSTRACT

An animal training device for use with a head collar, a neck collar and a leash simultaneously includes: an elastic body removably coupled between the neck collar and the leash, the elastic body lengthening in response a separating force between the neck collar and the leash and an inelastic line removably coupled between a snout portion of the head collar and the leash, the inelastic line having a fixed length. When the animal pulls against the leash, the inelastic line exerts a force on the snout portion of the head collar.

15 Claims, 11 Drawing Sheets

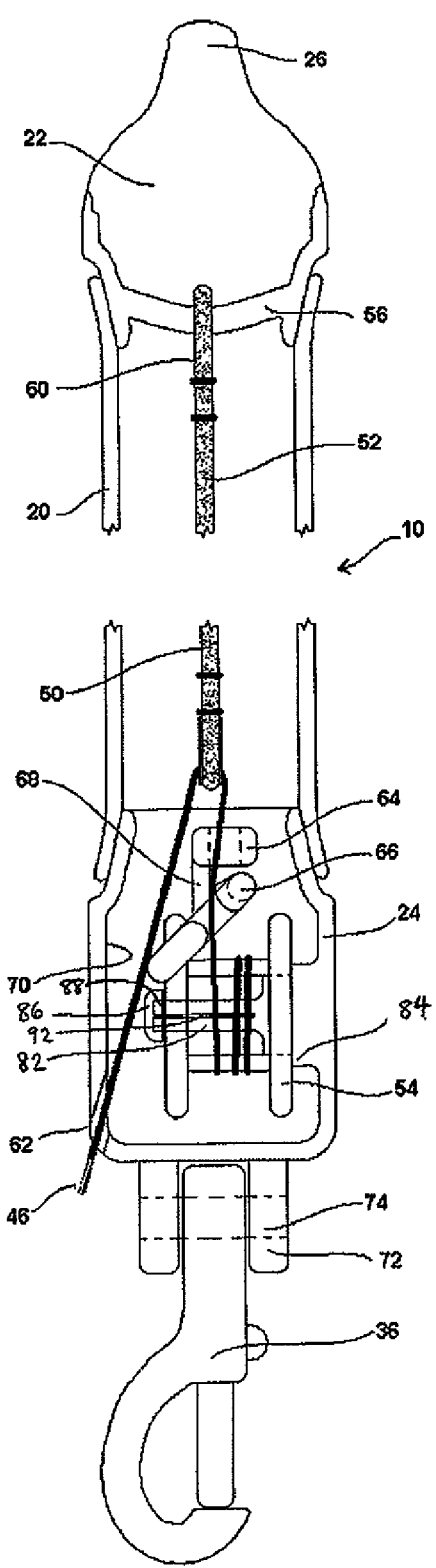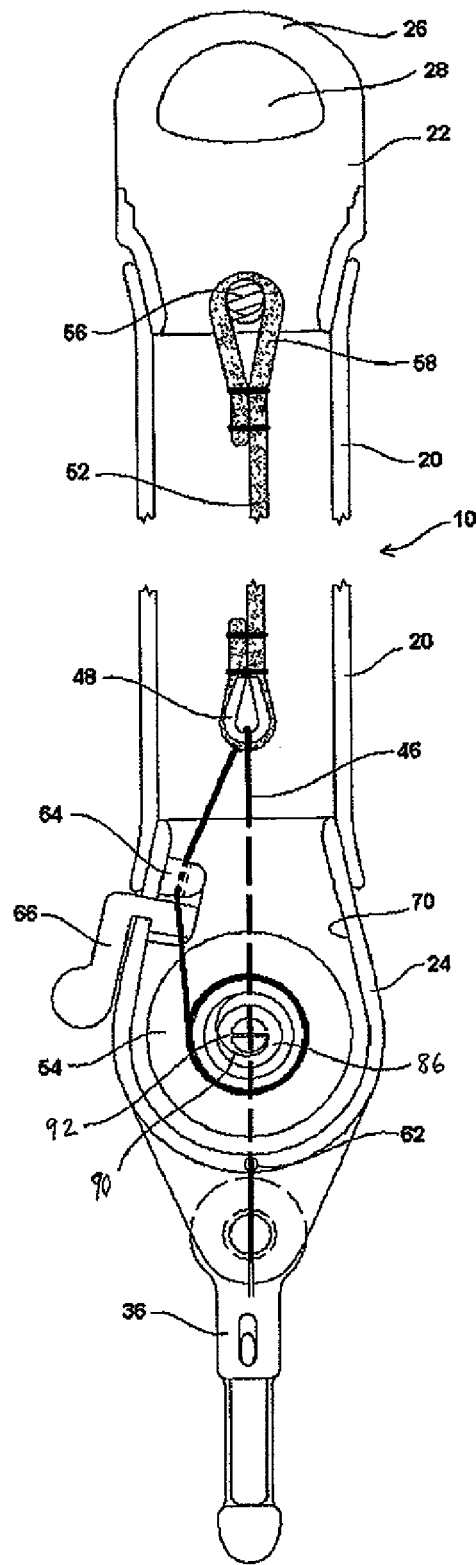
Figure 2                    Figure 3

ANIMAL TRAINING DEVICE

FIELD OF THE INVENTION

The present invention relates to animal training devices, in particular, dog training devices for use with leashes.

BACKGROUND OF THE INVENTION

It is very common for dogs to pull against their leashes while being walked. This generally results in an unpleasant and potentially dangerous walking experience for both the owner and the dog. Reducing or eliminating the pulling behaviour presents a challenge to the dog owner.

There are currently many different products that are available to reduce pulling behaviour. One such product is the Halti™, which is a type of head collar device. The Halti™ includes a first strap, which fastens behind the dog's ears, and a second strap, which is generally a noose that wraps around the dog's snout. The first and second straps are coupled to one another and a regular leash is hooked to the noose of the Halti™. When the dog pulls against the leash, the noose tightens and the dog's head is pulled in the direction of the walker. This sensation is aversive to the dog and therefore deters the dog from pulling against the leash.

Often, owners use headcollar devices as a means for training their dog to walk without pulling against the leash. The discomfort that the dog experiences when pulling against the headcollar is effective in reducing pulling when the device is on, however, when the owner switches to a neck collar, the dog usually returns to the pulling behaviour. Because the behaviour of the dog is only changed in response to the headcollar, this is not an effective training device.

It is therefore desirable to provide an animal training device for facilitating anti-pulling behaviour training for dogs.

SUMMARY OF THE INVENTION

An animal training device for use with an aversive restraint, a non-aversive restraint, and a leash. The animal training device includes means by which the aversive restraint is applied to the animal in response to the animal applying force above a preset threshold to the non-aversive restraint and the leash.

In one aspect of the present invention there is provided an animal training device for use with a head collar, a neck collar and a leash simultaneously, the animal training device including:

an elastic body removably coupled between the neck collar and the leash, the elastic body lengthening in response to an increase in tension between the neck collar and the leash;

an inelastic line removably coupled between a snout portion of the head collar and the leash, the inelastic line having a fixed length; and wherein lengthening of the elastic body causes the inelastic line to exert a force on the snout portion of the head collar.

In another aspect of the present invention there is provided an animal training device for use with a head collar, a neck collar and a leash simultaneously, the animal training device including:

a first spool and a second spool mounted in a housing, the second spool being coupled to the first spool and the housing being removably coupled to the neck collar;

a first inelastic line wound around the first spool, an end of the first inelastic line being removably coupled to the leash and the first inelastic line extending in response to an increase in tension between the leash and the neck collar;

a second inelastic line wound around the second spool, an end of the second inelastic line being removably coupled to a snout portion of the head collar;

a torsion spring coupled to the first spool, the torsion spring for biasing the first spool in a retracting direction;

wherein extension of the first inelastic line causes the second inelastic line to retract and exert a force on the snout portion of the head collar.

BRIEF DESCRIPTION OF THE DRAWINGS

The invention will be better understood with reference to the following Figures in which like numerals denote like parts and in which:

FIG. 2 is a cross-sectional side view of the animal training device of FIG. 1 in a locked position;

FIG. 3 is a cross-sectional top view of the animal training device of FIG. 1 in a locked position.

DETAILED DESCRIPTION OF THE PREFERRED EMBODIMENTS

Figure 1:
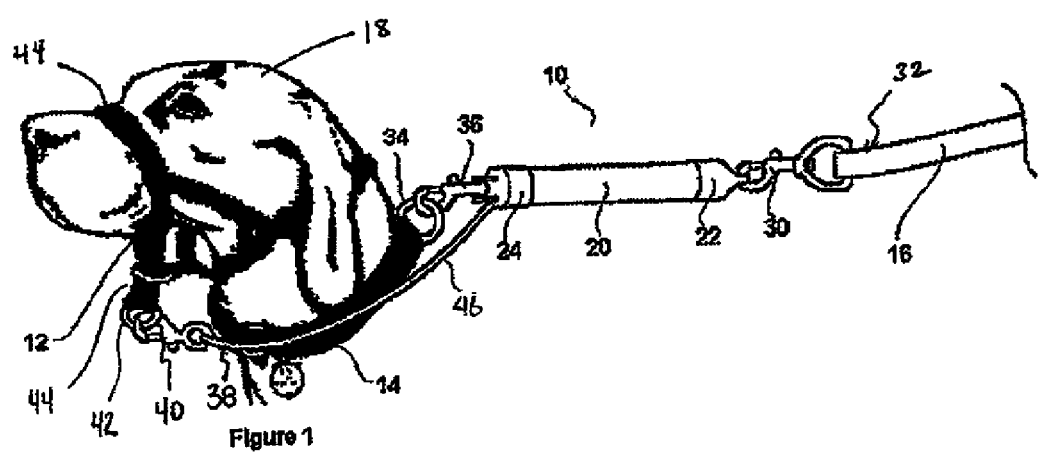
FIG. 1 is a side view of a dog wearing an animal training device according to an embodiment of the present invention.

Referring to FIG. 1, an animal training device 10 according to an embodiment of the present invention is generally shown. As shown, the animal training device 10 is for use with a head collar 12, a neck collar 14 and a leash 16 of an animal, such as a dog 18, for example.

Referring also to FIGS. 2 and 3, the training device 10 includes a elastic tube 20, which extends between a first body 22 and a second body 24. The first body 22 includes a projection 26 having an aperture 28 for receiving a leash spring latch 30, which is provided at a connecting end 32 of the leash 16. A first device spring latch 36 extends from the second body 24 for connecting to a ring 34 of neck collar 14. The first device spring latch 36 is secured between lugs 72 of the second body 24 by fastener 74.

The elastic tube 20 is secured to the first body 22 and second body 24 using an adhesive. Suitable adhesives include Neoprene Adhesive Contact 80 and Fastbond Contact Adhesive 30-NF, which are manufactured by 3M, or Barges Glue, which is manufactured by Grainer, for example. The elastic tube 20 may alternatively be secured by wrapping the ends using an inelastic material, such as thread or dental floss, for example. The elastic tube 20 is made of an elastic material that stretches along its length under tension, such as latex or synthetic rubber, for example. The elastic tube 20 may alternatively be made of another suitable material such as a synthetic polymer from Magister Corporation or a thermoplastic elastomer from Kent Elastomer, for example.

Together, the first body 22, elastic tube 20 and second body 24 provide an elastic assembly that is coupled between the leash 16 and the neck collar 14 to generally function as an elastic extension of the leash 16.

The training device 10 further includes an inelastic line 46, which extends through an opening 62 in the second body 24. A distal end 38 of the inelastic line 46 includes a second device spring latch 40 for connecting to a ring 42 of a snout portion 44 of the head collar 12. An opposite end (not shown) of the inelastic line 46 is threaded through a first loop 48 of a fixed line 52 and then wound around a spool 54. The fixed line 52 includes a free end 50, which receives the inelastic line 46, a fixed end 60. The fixed end 60 includes a second loop 58 that is secured around a bar 56 of the first body 22.

Spool 54 is rotatably mounted on an axle 82 in the second body 24. The axle 82 extends from an inner surface 70 of the second body 24 and includes a stepped base 84. As shown in FIG. 2, non-rotational movement of the spool 54 is restricted by sandwiching the spool 54 between the stepped base 84 and a cap 86, which is secured to a free end 88 of the axle 82. The spool 54 is tensioned by a torsion spring 90. The torsion spring 90 is generally a spring steel ribbon having an inner spring end fixed in an axle slot 92 and an outer spring end fixed in a slot (not shown) that is provided in the inner surface of the spool 54. A guide loop 64 is molded to the inner surface 70 of the second body 24, as shown in FIG. 3. The inelastic line 46 is threaded through the guide loop 64 between the spool 54 and the first loop 48 of the fixed line 52. A cam locking plate 68 is molded onto the inner surface 70 of the second body 24 adjacent the guide loop 64. A cam lock 66 passes through the wall of the second body 24 so that it may be manually moved by a user of the training device 10.

Figure 4:
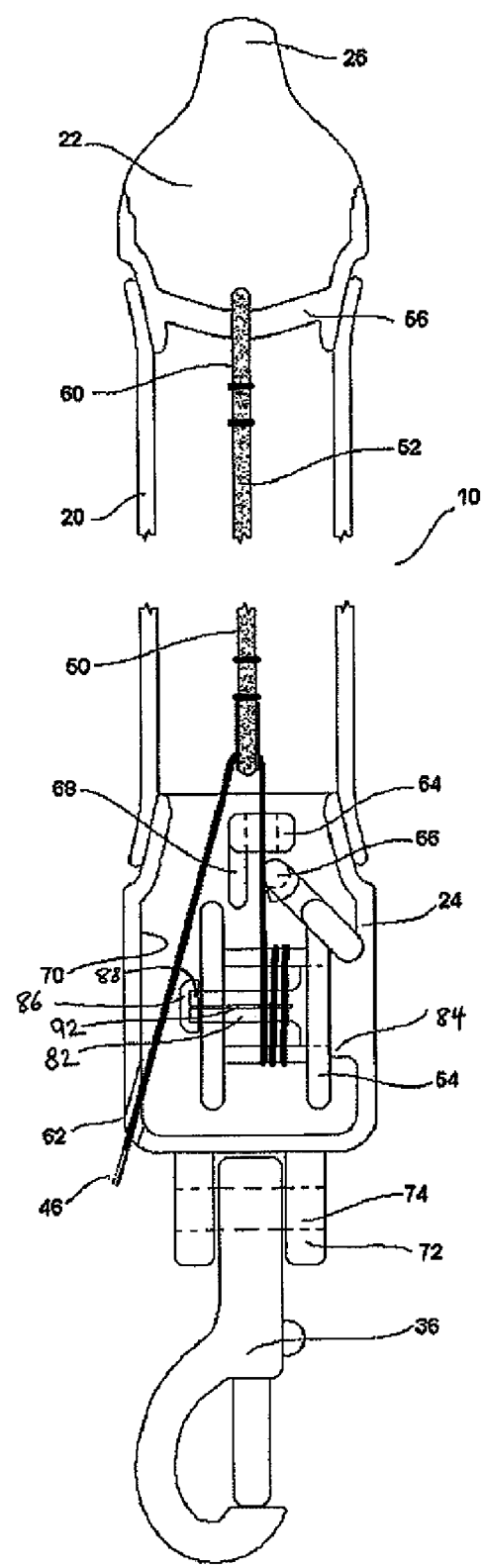
FIG. 4 is a cross sectional top view of the animal training device of FIG. 1 in an open position.

The cam lock 66 is movable between a locked position, which is shown in FIGS. 2 and 3, and an unlocked position, which is shown in FIG. 4. In the locked position, the inelastic line 46 is clamped against the cam locking plate 68 so that the spool 54 is unable to retract the inelastic line 46 and a combined length of the fixed line 52 and the inelastic line 46 remains constant.

In the unlocked position, the inelastic line 46 is free so that a length between the fixed line 52 and the distal end 38 of the inelastic line 46 may be adjusted to accommodate different sized dogs. The spool 54 is biased by the torsion spring to retract the inelastic line 46 when the cam lock is in the unlocked position. As such, when the training device 10 is not in use, the inelastic line 46 is retracted until the spring latch 40 which is too large to pass through opening 62, abuts the second body 24.

In use, the training device 10 is secured to a dog by clipping the first device spring latch 36 to the ring 34 of the dog's neck collar 14 and clipping leash spring latch 30 to the first body 22 of the training device 10 through aperture 28. The cam lock 66 is then moved to the open position of FIG. 4 and the second device spring latch 40 is clipped to ring 42 of snout portion 44 of the dog's head collar 12. The length of the inelastic line 46 is then adjusted so that when the elastic tube 20 is in an unstretched state, there is no tension on the snout portion 44 of the head collar 12 and one or two inches of slack in the inelastic line 46 when the dog's snout is directed forward.

Once the training device 10 has been secured to the dog, the dog can be walked in the same manner as with any leash and collar. When the dog pulls against its leash, a separating force occurs between the leash and collar. In response to this increase in tension between the leash and collar, the first body 22 of the training device 10 moves away from the second body 24 of the training device 10 and the elastic tube 20 stretches. At the same time, because the fixed line 52 is pulled away from the second body 24 along with the first body 22, once the slack in the inelastic line 46 has been taken up, the inelastic line 46 pulls the snout of the dog backwards towards the training device 10. Hence, the dog exerting a sufficient force on its neck collar 14 to take up the slack in the inelastic line 46, will feel at the same time a force exerted on the snout portion 44 of its head collar 12. As the dog pulls harder, the force on both the neck collar 14 and the head collar 12 increases.

The training device 10 is effective because dogs tend to pull less against a head collar 12 than a neck collar 14 due to the increased discomfort associated with a head collar 12. The training device 10 trains the dog to associate the sensation of a pull on the neck collar 14 with the sensation of a pull on the head collar 12. As a result, when the head collar 12 is removed and the dog is walked with only a neck collar 14 and a leash 16, the dog responds to a pull on its neck collar 14 in the same manner as it would if it were wearing the head collar 12 and the training device 10.

It will be appreciated by a person skilled in the art that the length of the inelastic line 46 may be adjusted so that a force is applied to the head collar 12 at the slightest lengthening of the elastic tube 20 or, alternatively, only once the elastic tube 20 is near its fully stretched length. Any length in between may also be selected.

In addition, it will be appreciated by a person skilled in the art that the cam lock 66 and cam locking plate 68 can be replaced with another means for preventing spool 54 from rotating. Suitable devices include those found in retractable leashes, for example.

Figure 5:
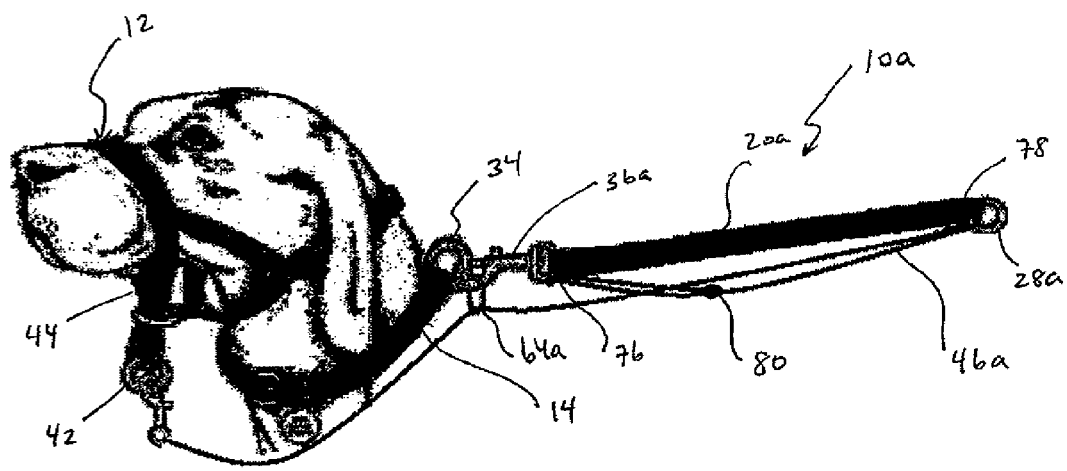
FIG. 5 is a side view of a dog wearing an animal training device according to another embodiment of the present invention.

Referring to FIG. 5, another embodiment of an animal training device 10a is generally shown. Reference numerals in this embodiment correspond to parts having similar functions in the embodiment of FIGS. 1-4. An elastic line 20a includes a spring latch 36a, which is provided at a first end 76 thereof, and a ring 28a, which is provided at a second end 78 thereof. When in use, the spring latch 36a is connected to ring 34 of neck collar 14 and a leash (not shown) is connected to the ring 28a. An inelastic line 46a is secured to the first end 76 of the elastic line 20a, looped through ring 28a and doubled back through a guide ring 64a to attach to ring 42 of snout portion 44 of the head collar 12. A lockable sliding loop fastener 80 is provided to allow the length of the inelastic line 46a to be adjusted.

The training device 10a functions in a similar manner as the training device 10 of FIGS. 1-4. When the dog pulls against the leash, the elastic line 20a stretches. Once the elastic line 20a has stretched beyond a limit, which is determined by the length of the inelastic line 46a, the inelastic line 46a is shortened at approximately twice the rate at which the elastic line 20a is lengthened. In this manner, the dog feels resistance at the neck collar 14 and if the dog continues to pull, the dog also feels increasing resistance at the head collar 12.

Figure 6:
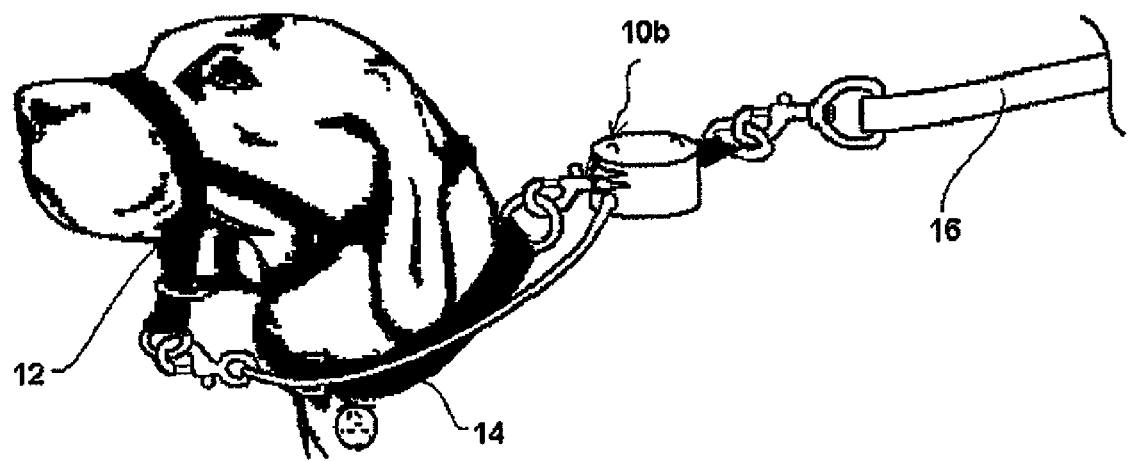
FIG. 6 is a side view of a dog wearing an animal training device according to yet another embodiment of the present invention.
Figure 7:
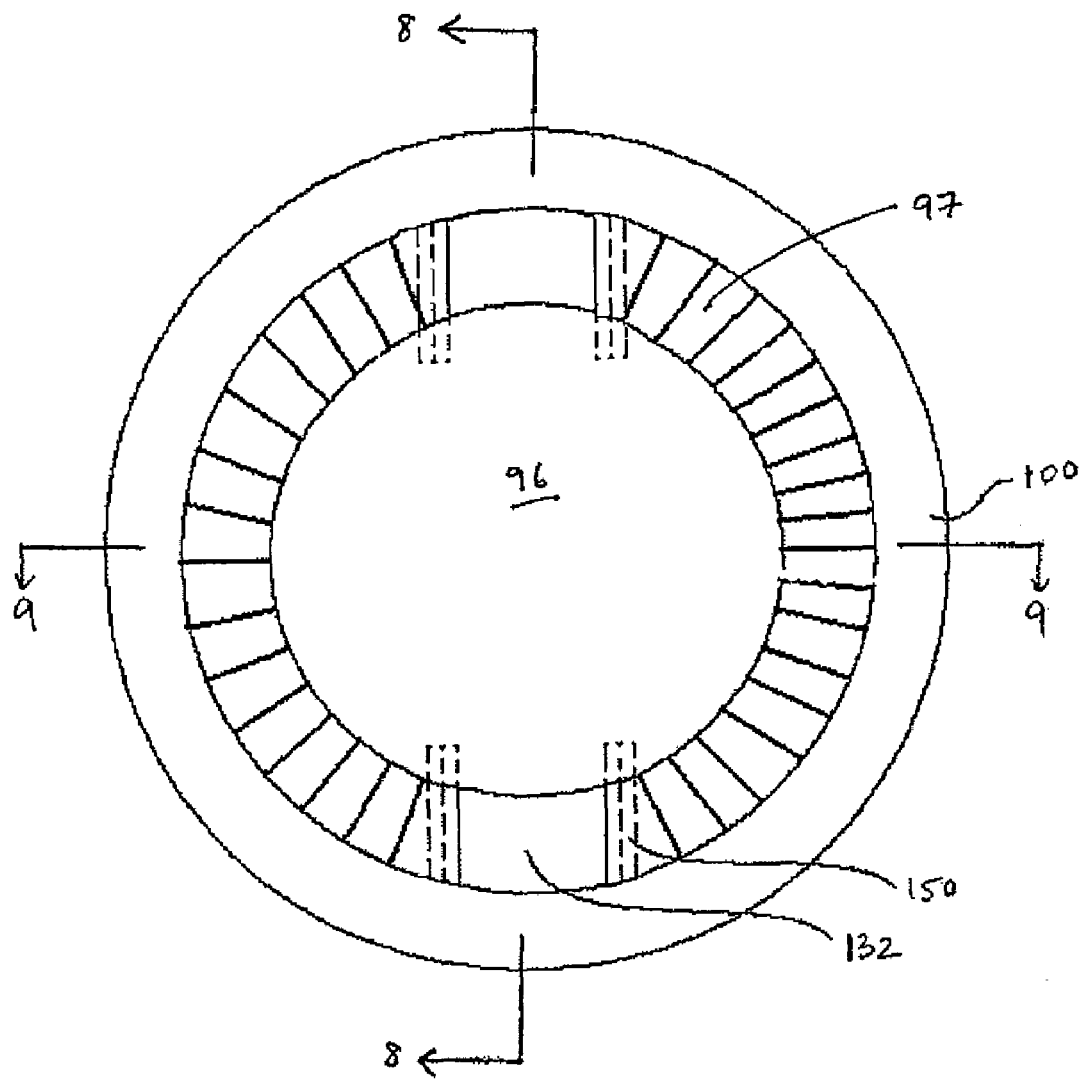
FIG. 7 is a top view of portions of the animal training device of FIG. 6.

Referring to FIG. 6, another embodiment of an animal training device 10b is generally shown. Reference numerals in this embodiment correspond to parts having similar functions in the embodiment of FIGS. 1-5. The training device 10b generally includes a generally cylindrical housing 94 that is provided between neck collar 14 and leash 16. Similar to the previously described embodiments, the training device 10b also includes a spring latch 36b, which extends from the body 96, for connecting to ring 34 of neck collar 14. The spring latch 36b is secured between lugs 72b of the housing 96 by fastener 74b.

Figure 8:
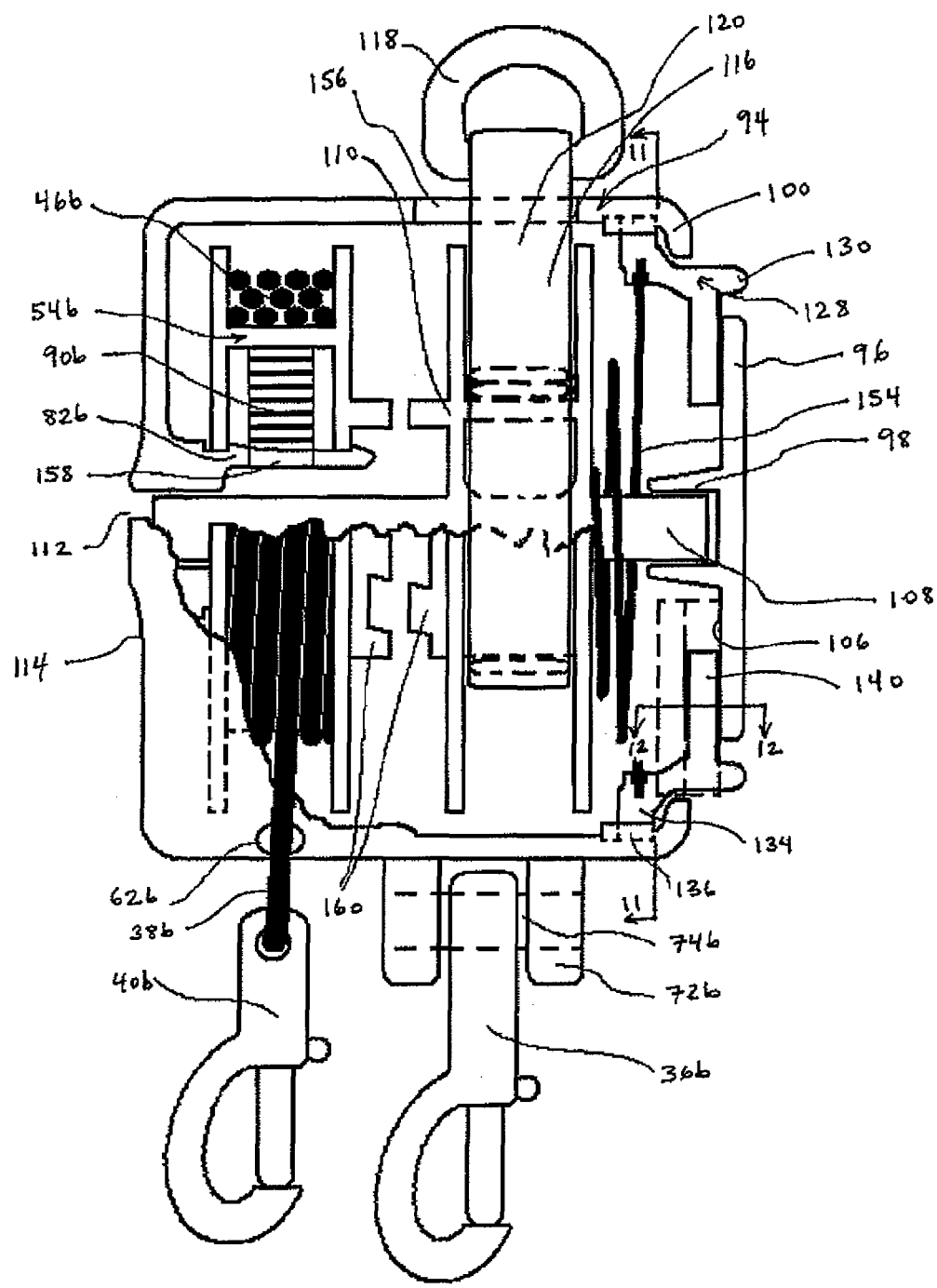
FIG. 8 is a partial sectional view on 8-8 of FIG. 7 of the animal training device in an open position.
Figure 9:
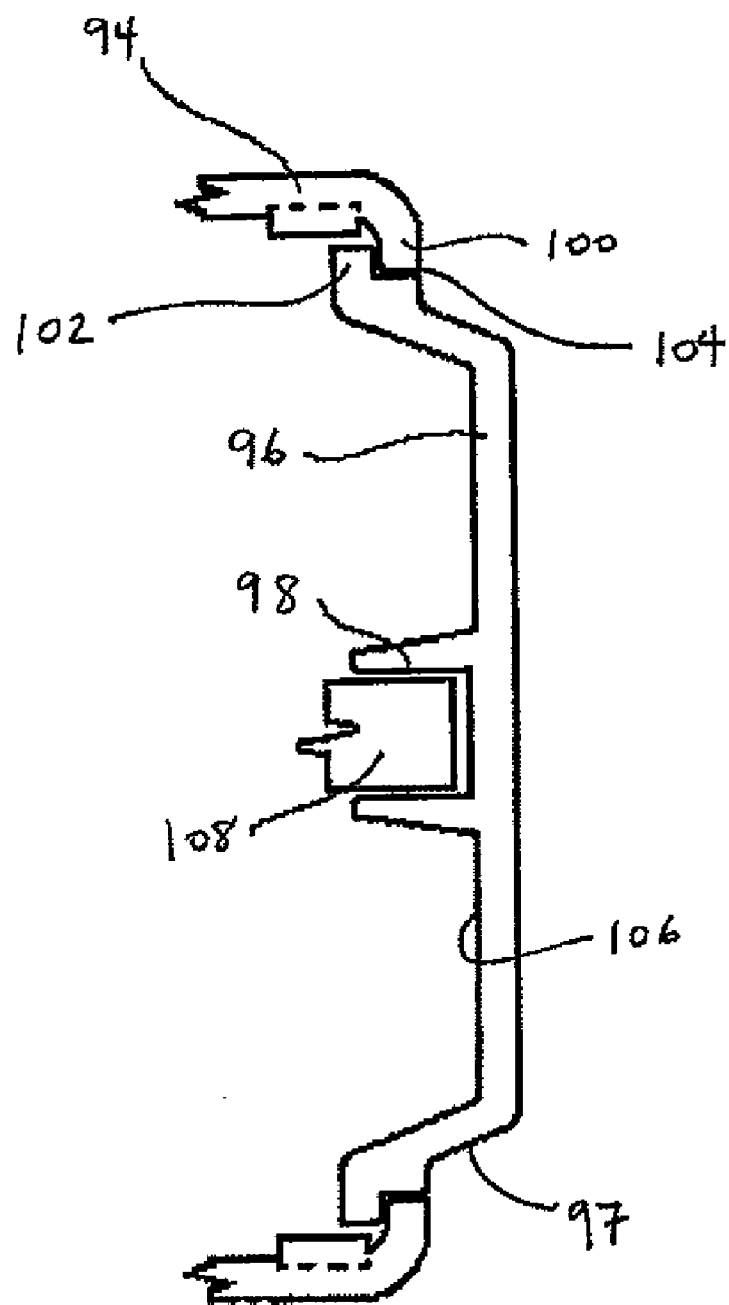
FIG. 9 is a view on 9-9 of FIG. 7 of a cover of the animal training device of FIG. 6.

Referring also to FIGS. 7 to 11, the generally cylindrical housing 94 includes an end cap 96, which is rotatable relative to the housing 94. An inwardly extending edge 100 of the housing 94 overlaps an outer flange 102 of the end cap 96 in order to couple the end cap 96 to the housing 94, as shown in FIG. 9. The inwardly extending edge 100 abuts a step 104 of the end cap 96 in order to center the end cap 96 within the housing 94. The end cap 96 further includes a ridged surface 97 so that the end cap 96 may be gripped in order to facilitate rotation by the user.

A first axle 108 extends between a generally cylindrical flange 98, which protrudes from an inner surface 106 of the end cap 96, and an aperture 112, which is provided in an opposite end 114 of the housing 94. The flange 98 and aperture 112 function as bearings to allow the first axle 108 to rotate generally about a longitudinal axis of the housing 94. A first spool 110 is mounted on the first axle 108 and a first inelastic line 116 is wound around the first spool 110. The first inelastic line 116 extends through aperture 156 in the housing 94. A ring 118 of the first inelastic line 116 is provided at a free end 120 thereof and the second end (not shown) of the first inelastic line 116 is secured to the first spool 110. The ring 118 is clipped to leash spring latch 30, when the animal training device 10b is in use.

A second axle 82b extends from an interior surface 122 of the housing 94 at the opposite end 114 thereof. The second axle 82b includes aperture 112, which extends therethrough, for receiving the first axle 108. A second spool 124 is mounted on the second axle 126 and a second inelastic line 46b, which extends through an opening 62b in the housing 94, is wound around the second spool 124. A distal end 38b of the second inelastic line 46b includes a second device spring latch 40b for connecting to ring 42 of snout portion 44 of head collar 12. A flat torsion spring 90b is mounted on the second axle 82b to bias the second axle 82b to retract the second inelastic line 46b. An inner end (not shown) of the flat torsion spring 90b is fixed in an aperture 158 of the second axle 82b.

Pawl bodies 128 are coupled between the end cap 96 and the housing 94. Each pawl body 128 includes an adjustment flange 130, which extends through opening 132 in the end cap 96, and a pawl 134. A pawl flange 140 is received in slots 150 of flanges 142, which extend from the inner surface 106 of the end cap 96. The flanges 142 restrict circumferential movement of the pawl bodies 128 relative to the end cap 96.

A torsion spring 154, which is coupled between the pawls 134 and the first axle 108, biases the first spool 110 to retract the first inelastic line 116. The torsion spring 154 further biases the pawl bodies 128 into engagement with teeth 136, which are formed on an inner surface 138 of the housing 94, and biases the first axle 108 toward the opposite end 114 of the housing 94. The end cap 96 and pawl bodies 128 provide a tension adjusting assembly for the torsion spring 154. In order to adjust the tension, the pawls 134 are moved out of engagement with the teeth 136 by displacing the adjustment flanges 130 radially toward the center of the end cap 96. The end cap 96 is then rotated to adjust the tension on the torsion spring 154. Once the desired tension has been set, the adjustment flanges 130 are released and the pawls 134 re-engage the teeth 136.

Figure 10:
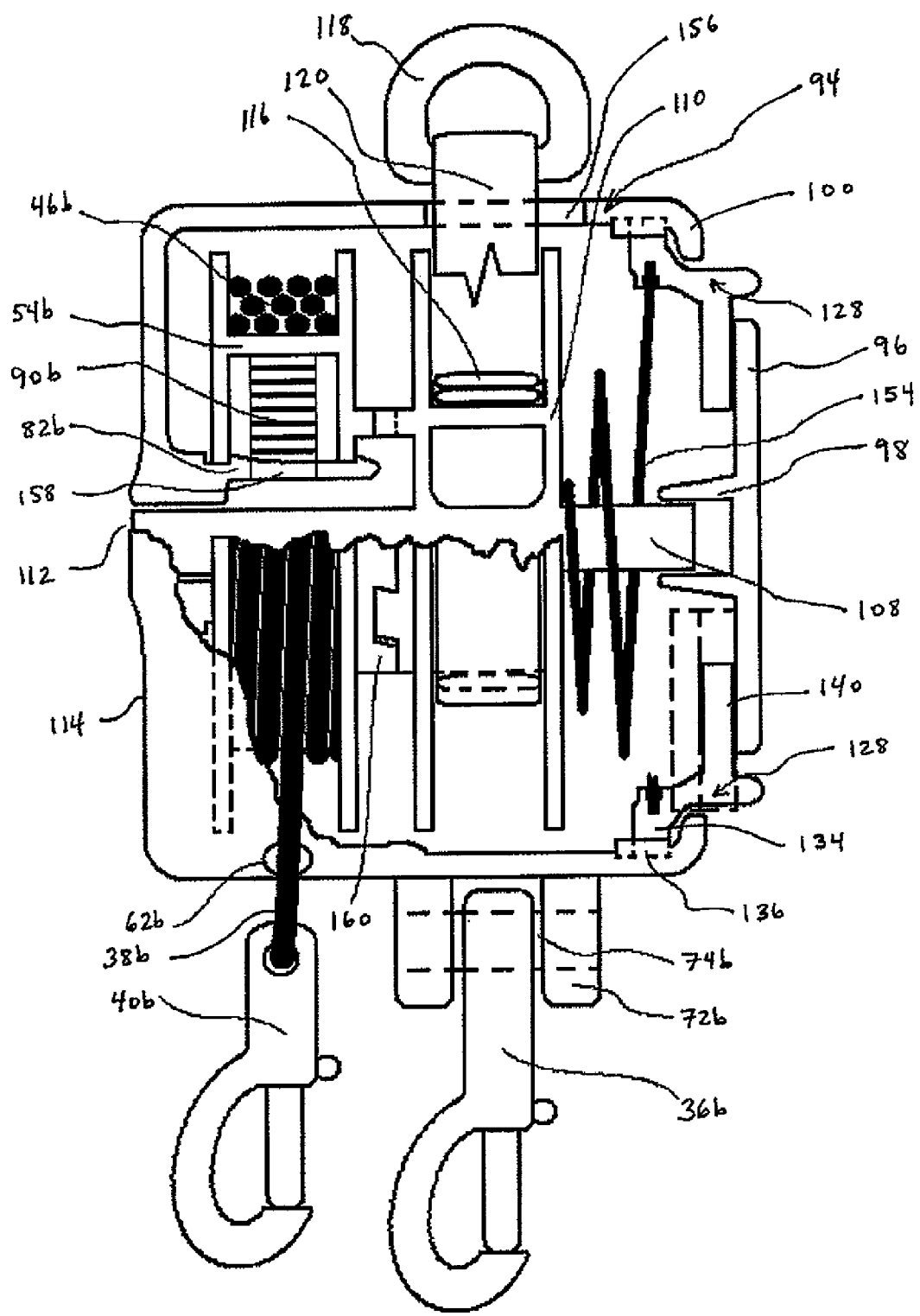
FIG. 10 is a partial sectional view on 8-8 of FIG. 7 of the animal training device in a closed position.
Figure 11:
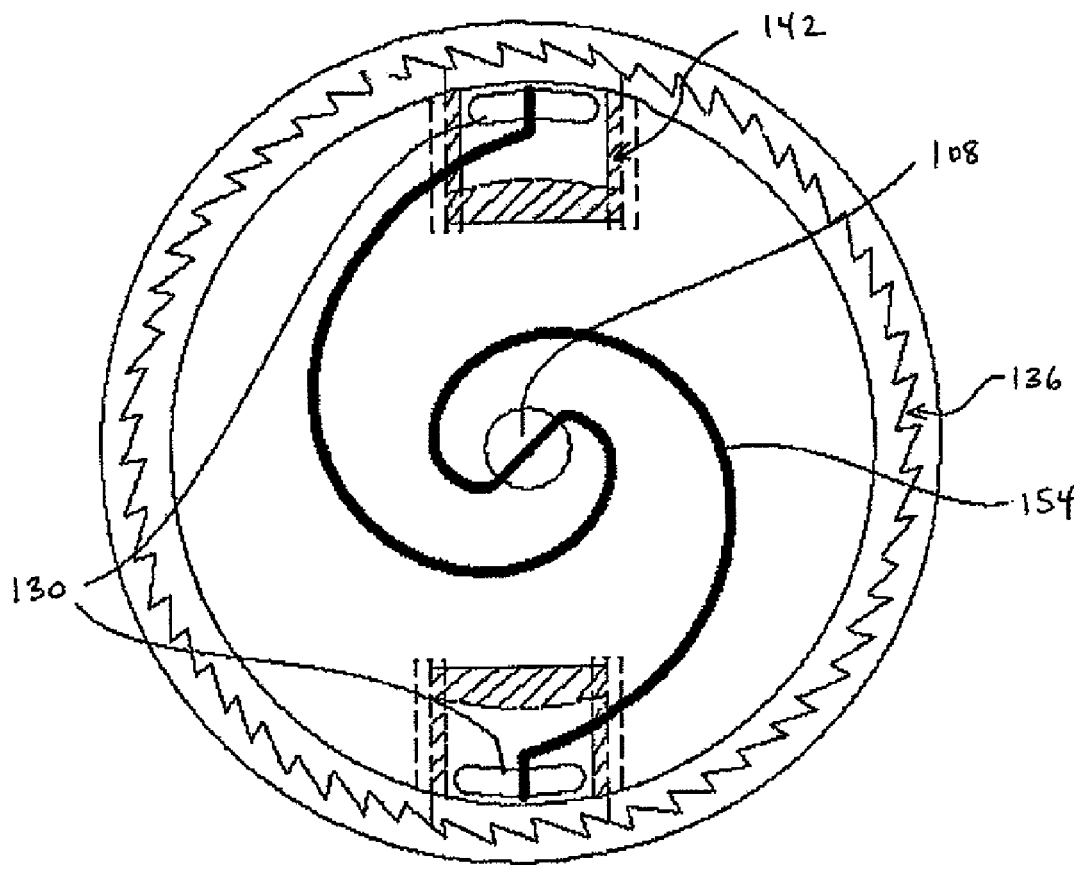
FIG. 11 is a view on 11-11 of FIG. 8.
Figure 12:
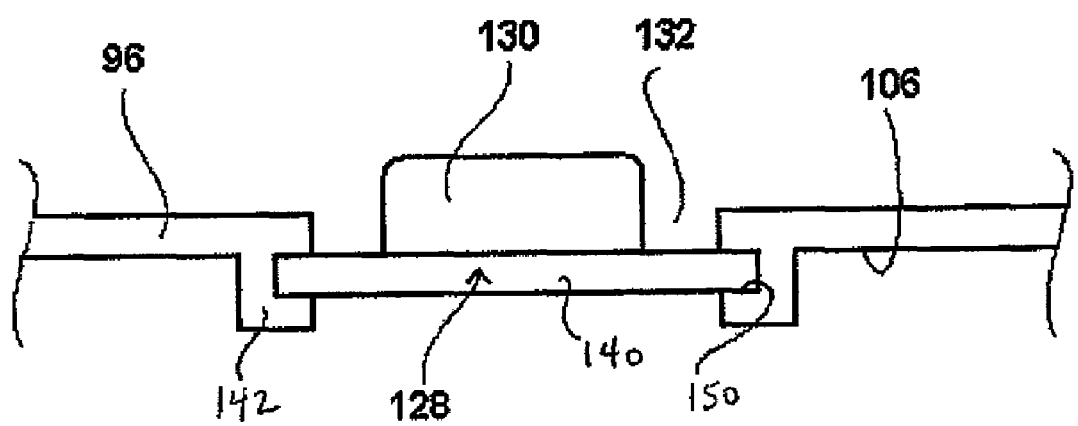
FIG. 12 is a 12-12 of FIG. 8.

The first spool 110 and the second spool 54b are releasably coupled to one another by mating cog teeth 160, which extend from adjacent sides of the first and second spools, 110 and 154b, respectively. The torsion spring 154 biases the first axle 108 into a closed position, which is shown in FIG. 10. In the closed position, the cog teeth 160 engage one another and the second axle 82b and the first axle 108 move as a unit. The first axle 108 is movable from the closed position of FIG. 10 into an open position, which is shown in FIG. 8, by manually pushing the first axle 108 in the direction of the torsion spring 154. The first axle 108 is accessible by the user through the aperture 112 on the opposite end 114 of the housing 94. In the open position, the cog teeth 160 are spaced from one another and the second axle 82b moves independently of the first axle 108.

In use, the training device 10b is secured to a dog by clipping the spring latch 36b to the ring 34 of the dog's neck collar 14 and clipping leash spring latch 30 to the ring 118 of the training device 10b. The accessible end of the first axle 108 is pushed into the open position of FIG. 7 and spring latch 40b is clipped to ring 42 of snout portion 44 of the dog's head collar 12. The length of the second inelastic line 46b is then adjusted so that there is no tension on the ring 118, no tension on the snout portion 44 of the head collar 12 and one or two inches of slack in the second inelastic line 46b when the dog's snout is directed forward.

Once the training device 10b has been secured to the dog, the dog can be walked in the same manner as with any leash and collar. When the dog pulls against its leash with sufficient force to overcome the torsion spring 154, the first inelastic line 116 extends. As the first inelastic line 116 extends, the first spool 110 and the second spool 54b are rotated, which causes the second inelastic line 46b to be retracted. Once the slack in the second inelastic line 46b has been taken up, the second inelastic line 46b pulls the snout of the dog backward towards the training device 10b. Hence, the dog exerting a sufficient force on its neck collar 14 to take up the slack in the second inelastic line 46b, will feel at the same time a force exerted on the snout portion 44 of its head collar 12. As the dog pulls harder, the force on both the neck collar 14 and the head collar 12 increases.

It will be appreciated that the ratio of the spool diameters in the training device 10b may be adjusted. For example, a ratio of 2:1 would cause the second inelastic line 46b to be retracted at twice the rate that the first inelastic line 116 is unspooled.

Similar to the training devices 10 and 10a, the length of the second inelastic line 46b can be adjusted to set the level of leash tension at which force is exerted on the snout portion 44 of the head collar 12. In addition, the end cap 96 of the training device 10b can be rotated clockwise to increase the resting tension in the torsion spring 154, thereby increasing the level of pulling force required to cause a force to be exerted on the snout portion 44 of the head collar 12. Alternatively, the pawls 134 can be disengaged from the teeth 136 and the end cap 96 rotated counterclockwise to decrease the resting tension in the torsion spring 154. Thus, decreasing the level of pulling force required to cause a force to be exerted on the snout portion 44 of the head collar 12.

In still another embodiment, the animal training device 10b of FIGS. 6 to 11 is modified such that the first and second inelastic lines 116, 46b would exit the housing 94 from adjacent apertures and the leash 16 would attach directly to the housing on the opposite side thereof. The lines 116, 46b would be wound in opposite directions and respective spools of the lines 116, 46b would provide a 1:2 takeup ratio, as the housing 94 moves away from the neck collar 14 in response to pulling behavior of the dog.

In yet another embodiment, the animal training device 10 of FIGS. 1 to 4 is modified such that the fixed line 52 is removed and the inelastic line passes through the elastic tube 20 and out of the top of the first body 22. This embodiment is for use with aversive restraints having loops for receiving the leash that are located closer to the handler than the neck collar ring 34. Examples of such aversive restraints include: Gentle Leader, Lupi harness and Sporn harness.

It will be appreciated by a person skilled in the art that the training device 10, 10*a*, 10*b* and other embodiments may be used with any type of head collar 12 having a snout portion 44, any type of neck collar 14 and any type of leash 16 including a retractable leash. Further, the animal training device 10, 10*a*, 10*b* and other embodiments may be used with other types of aversive anti-pull training devices such as Lupi harness, a Sporn Harness, which is described in U.S. Pat. No. 5,359,964, Gentle Leader or pinch collar, for example.

Specific embodiments of the present invention have been shown and described herein. However, modifications and variations may occur to those skilled in the art. For example, a modification might be developed to train horses to respond to rein commands without a bit in their mouths. All such modifications and variations are believed to be within the sphere and scope of the present invention.

What is claimed is:

1. An animal training system, comprising an animal training device, a head collar, a neck collar, and a leash, said animal training device comprising:
    a stretchable elastic body directly connected to each of said neck collar and said leash, said stretchable elastic body lengthening in response to an increase in tension between said leash and said neck collar;
    an inelastic line connected to a snout portion of said head collar and to said leash through said stretchable elastic portion, said inelastic line having a fixed length; and
    wherein lengthening of said stretchable elastic body causes said inelastic line to exert a force on said snout portion of said head collar.

2. An animal training device as claimed in claim 1, wherein a fixed line is provided inside said stretchable elastic body and said inelastic line is coupled to a free end of said fixed line.

3. An animal training device as claimed in claim 1, wherein said inelastic line is wound on a spool, said spool be coupled inside said elastic body.

4. An animal training device as claimed in claim 2, wherein said fixed length of said inelastic line is maintained by a cam lock, said cam lock secures said inelastic line against a cam locking plate.

5. An animal training device as claimed in claim 4,
    wherein said fixed length of said inelastic line is increased by unlocking said cam lock, unwinding said inelastic line and re-locking said cam lock.

6. An animal training device as claimed in claim 4,
    wherein said fixed length of said inelastic line is decreased by unlocking said cam lock, retracting said inelastic line and re-locking said cam lock.

7. An animal training device as claimed in claim 1, wherein a material of said stretchable elastic body is selected from the group consisting of: latex,
    synthetic rubber, synthetic polymer and thermoplastic elastomer.

8. An animal training system, comprising an animal training device, a head collar, a neck collar, and a leash, said animal training device comprising:
    a first spool and a second spool mounted in a housing, said second spool being coupled to said first spool and said housing being removably coupled to said neck collar;
    a first inelastic line wound around said first spool, an end of said first inelastic line being removably coupled to said leash and said first inelastic line extending in response to an increase in tension between said leash and said neck collar;
    a second inelastic line wound around said second spool, an end of said second inelastic line being removably coupled to a snout portion of said head collar;
    a torsion spring coupled to said first spool, said torsion spring for biasing said first spool in a retracting direction;
    wherein extension of said first inelastic line causes said second inelastic line to retract and exert a force on said snout portion of said head collar.

9. An animal training device as claimed in claim 8, wherein said second spool is selectively coupled to said first spool.

10. An animal training device as claimed in claim 9, wherein said first spool and said second spool are uncoupled by moving said first spool away from said second spool.

11. An animal training device as claimed in claim 8, further comprising a tension adjusting assembly for said torsion spring.

12. An animal training device as claimed in claim 11, wherein said torsion spring is coupled between said tension adjusting assembly and a first spool axle of said first spool and rotation of said tension adjusting assembly relative to said housing adjusts a tension of said torsion spring.

13. An animal training device as claimed in claim 12, wherein said tension adjusting assembly includes a pair of pawl bodies coupled to an end cap, said pawl bodies for selectively engaging teeth provided on an inner surface of said housing.

14. An animal training device as claimed in claim 10, wherein an initial length of said second inelastic line is adjustable.

15. An animal training device as claimed in claim 14, wherein said initial length of said second inelastic line is adjustable by rotating said second spool independently of said first spool.

\* \* \* \* \*